Jan. 22, 1952     F. E. PORAMBO     2,583,118
PORTABLE HOT FOOD CABINET
Filed June 22, 1949
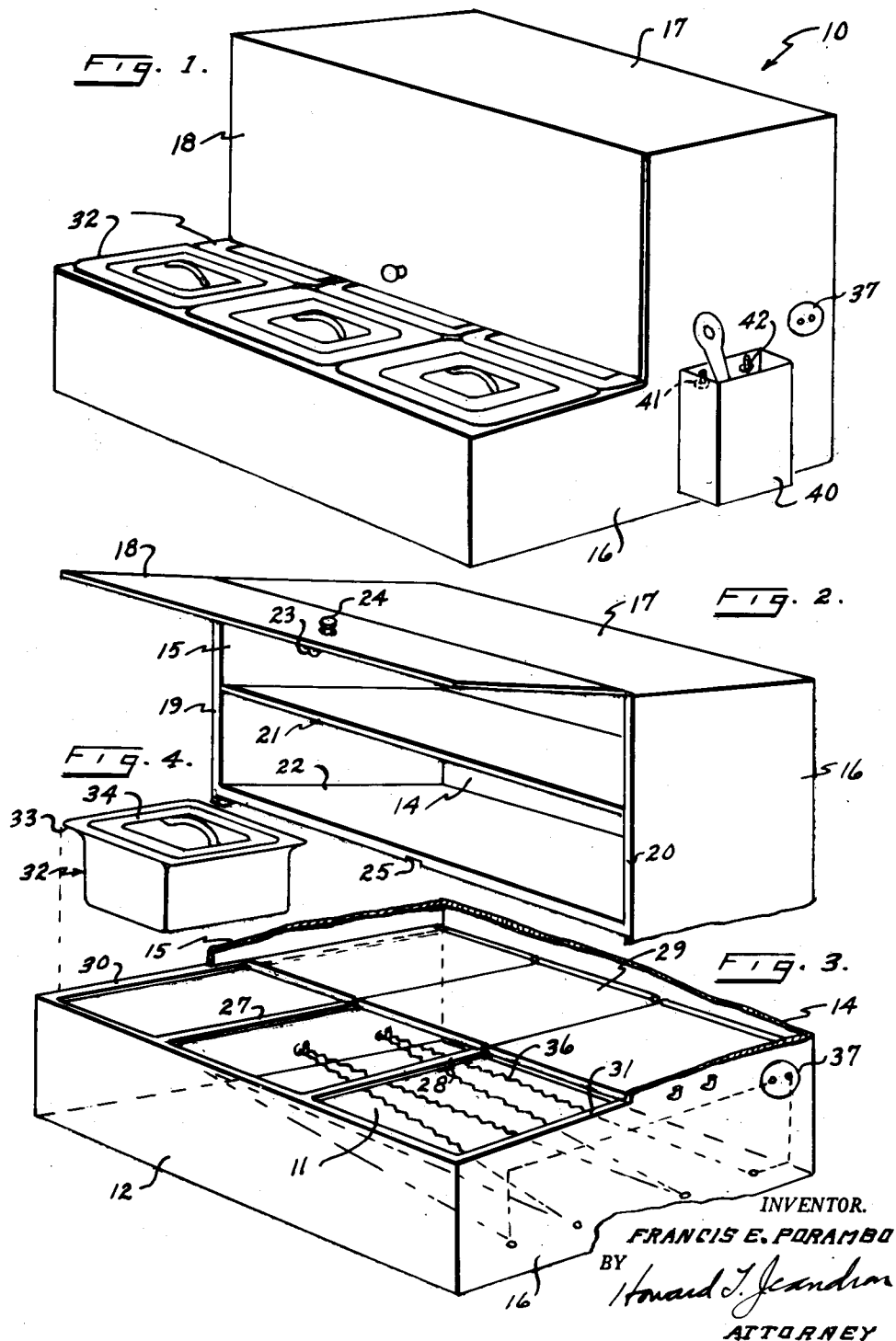
INVENTOR.
FRANCIS E. PORAMBO
BY
Howard T. Jeandron
ATTORNEY Patented Jan. 22, 1952

2,583,118

UNITED STATES PATENT OFFICE 2,583,118

PORTABLE HOT FOOD CABINET

Francis E. Porambo, Cliffwood Beach, N. J.

Application June 22, 1949, Serial No. 100,691

3 Claims. (Cl. 219—19)

This invention relates to a portable hot food cabinet and more particularly to a small food cabinet that is adapted to be easily moved or transported and that may be plugged into the nearest electric receptacle to provide energy to keep the warming elements energized.

In the past there has been provided in most quick lunch counters and similar places an electric hot plate or gas hot plate that is turned on when needed and on which pots or containers of food may be warmed or heated for use. Another form of food device in common use is the small steam table wherein a plurality of food containers may be nested and hot water or steam is provided below these containers to keep them at a proper temperature for serving. This type of device does not lend itself to a portable unit.

It is an object of this invention to provide a cabinet which supports a plurality of food containers and provides a heating element to maintain the food containers at a desired degree of temperature.

It is a further object of this invention to provide a sandwich cabinet that is small and easily transported or moved but compact to support a plurality of food containers in an easily accessible position as well as providing a rack or oven adjacent to the food containers for retaining rolls or bread for the sandwiches.

A further object of this invention is to provide a sandwich cabinet in which a plurality of food containers may be supported so that one set of food containers are easily accessible for use while a second set of similar containers are positioned so that they may be moved into the position of the first set upon removal of any one or all of the containers of the first set and in which a heating element is provided to retain all food containers at a desired degree of temperature.

A still further object of this invention is to provide a sandwich cabinet in which a plurality of food containers are positioned with one set in an easily accessible position and a second set aligned with the first set to be moved into the position of the first set as the containers become emptied and are removed and in which a plurality of insulated covers are provided to enclose the area of the cabinet over the second set of containers when these containers are moved into the position of the first set of containers and in which a heating element is provided to retain all food containers at a desired degree of temperature.

Still another object of this invention is to provide a cabinet wherein the heating element may be removed and the cabinet may be mounted over any heating element to provide the necessary temperature surrounding the food containers mounted in the cabinet.

Other objects of this invention shall be apparent by reference to the accompanying description and the drawings in which:

Fig. 1 illustrates a perspective view of the hot food cabinet,

Fig. 2 illustrates the roll warming or oven portion of the cabinet,

Fig. 3 illustrates the lower portion of the cabinet with the food containers removed to illustrate the supporting structure and the covering lids for the food containers, and Fig. 4 illustrates a single food container.

Referring to Fig. 1 there is illustrated a cabinet 10 which is generally formed of a sheet metal exterior being completely enclosed on all sides. The container is generally rectangular in form.

Referring to Fig. 3 the lower portion is formed with a bottom plate 11, a front plate 12, a rear plate 14 and two side plates 15 and 16. The plate 14 extends to the full height of the cabinet and the plates 15 and 16 are so cut and formed that they also form the sides of the warming cabinets. There is a top plate 17 (Fig. 2) on the warming cabinet and a hinged cover or door 18 hinged to the edge of the top plate 17 and mating with the end faces 19 and 20 of the sides 15 and 16. The warming compartment may be provided with a pair of shelves 21 and 22. The hinged cover 18 is provided with a snap 23 and handle 24; the snap 23 is positioned to snap into cutout portion 25 of the shelf 22. The base portion of the cabinet in addition is provided with a pair of supporting cross members 27 and 28, and a plurality of hinged insulated lids 29 are secured to the rear plate 14, so that in their closed position the supporting members 27 and 28 provide the necessary support for these lids. The side plates 15 and 16 are provided with a turned in edge 30 and 31 to provide a supporting track for a food tray 32. The food trays 32 (Fig. 4) are constructed generally square in formation having an extended edge or rim 33 and a cover 34. The food tray 32 is formed of such a size as to fit within the area formed between the track 30 and 27, between the supports 27 and 28 or between the support 28 and track 31 so that the rim 33 of the container 32 rests upon the supporting area such as 30 and 27. Thus as illustrated in Fig. 1 with a container 32 positioned in the front area, a similar container 32 may be fitted in the rear area of the cabinet in alignment with the front container. In similar fashion containers 32 may be mounted in an aligned relation between supports 27 and 28 and between support 28 and the track 31. With the cabinet completely filled, the lids 29 are lifted sufficiently to permit the containers 32 to rest as illustrated in Fig. 1. Therefore there is a slight space provided between the top of the containers 32 and the bottom of the shelf 22. It is apparent that when any of the containers 32 are removed from the front area of the cabinet any one of the aligned containers mounted in the rear area of the cabinet may be slid forward to replace the container removed. When they are slid forward the lid 29 mounted thereover will drop to the position illustrated in Fig. 3 to retain the heat in the lower portion of the cabinet. The heat is provided in this embodiment by means of an electrical heating element 36 mounted above the bottom plate 11 and connected to a plug-in receptacle 37 mounted in the side plate 16. The circuit illustrated may or may not be provided with a switch (not shown). Another feature of the device illustrated is a spoon supporting container 40 Fig. 1 that may be affixed to the side 16 by means of a pair of pins 41 and 42. The container 40 is partially filled with water and due to the container being adjacent to the electric heating elements, the water therein will be maintained at a high degree of temperature thus assisting in maintaining a spoon or such article in a clean condition for use.

It is apparent that with the containers 32 being sealed that food contained therein may be kept at a reasonable temperature in condition for use continually without shutting off the heating element and the heating element may be so designed that the temperature will not exceed a desired degree and the food will be retained warm without cooking or drying. Due to the general conductivity and the percentage of heat loss there will be a reasonable temperature maintained in the roll or oven compartment. Therefore the rolls may be retained at a reasonable temperature for use.

Although we have illustrated a portable food sandwich cabinet with a plurality of features that are desirable to this particular embodiment, there may be various changes or modifications of this device without departing from the spirit of this invention and this invention shall be limited only by the appended claims.

What is claimed is:

1. A portable hot food cabinet having a lower square box-like section enclosed on four sides and on the bottom, an upper rectangular cabinet-like section mounted to cover approximately half of the lower box-like structure, a plurality of pairs of supporting track-like cross members mounted in parallel relationship across the top of said box-like section but at 90° to the face of said cabinet-like section, a plurality of square shaped food trays having extended rims, said food trays mounted in said box-like section and supported on said track-like cross members by their rims, said food trays mounted in pairs on said track-like cross members, an electric heating element mounted within said box-like section and dispersed evenly over the entire bottom area, a connecting plug mounted in the wall of said box-like section and connected electrically to said heating element, said cabinet-like section being formed with a plurality of shelves and having three sides and the top enclosed, a hinged cover mounted on the front face of said cabinet-like section, means to remove a food tray and in turn slideably move the tray supported on the same track into the position of the tray removed, means to connect an electric circuit to said plug and provide heat throughout the box-like structure, to parts being so constructed and arranged so as to provide a lesser degree of heat in said cabinet-like structure.

2. A portable hot food cabinet according to claim 1 in which a plurality of hinged covers are mounted between the box-like section and the cabinet-like section and are so fitted that when the food tray normally positioned in this area has been moved forward the hinged cover will completely seal the area between the supporting tracks to prevent excessive heat loss while the heating element is in use.

3. In a device according to claim 1 said cabinet-like structure provided with a tight fitting hinged cover having a snap lock affixed to said cover, means to snap said lock into a locked relationship with the lower most shelf to retain said cover in a tight locked relationship.

FRANCIS E. PORAMBO.

REFERENCES CITED

The following references are of record in the file of this patent:

UNITED STATES PATENTS

| Number | Name | Date |
|---|---|---|
| 1,307,048 | Hewitt | June 17, 1919 |
| 2,259,519 | Ershler | Oct. 21, 1941 |
| 2,481,384 | Blackwell | Sept. 6, 1949 |